US012596719B2

(12) United States Patent
Vellay et al.

(10) Patent No.: US 12,596,719 B2
(45) Date of Patent: Apr. 7, 2026

(54) SEARCH REQUEST PROCESSING

(71) Applicant: AMADEUS S.A.S., Biot (FR)

(72) Inventors: Xavier Vellay, Biot (FR); Yannick Devaux, Biot (FR); Mickael Coat, Biot (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/937,913

(22) Filed: Nov. 5, 2024

(65) Prior Publication Data

US 2025/0147967 A1    May 8, 2025

(30) Foreign Application Priority Data

Nov. 6, 2023    (EP) ..................................... 23315409

(51) Int. Cl.
*G06F 16/2455*    (2019.01)
*G06F 16/953*    (2019.01)

(52) U.S. Cl.
CPC ...... *G06F 16/24564* (2019.01); *G06F 16/953* (2019.01)

(58) Field of Classification Search
CPC .......................... G06F 16/24564; G06F 16/953
See application file for complete search history.

(56) References Cited

U.S. PATENT DOCUMENTS

| | | | |
|---|---|---|---|
| 8,782,077 B1 * | 7/2014 | Rowley | G06F 16/951 |
| | | | 707/769 |
| 8,949,277 B1 * | 2/2015 | Lieuwen | G06F 16/9535 |
| | | | 707/794 |
| 9,015,143 B1 * | 4/2015 | Sahin | G06F 16/3325 |
| | | | 707/765 |
| 10,275,493 B1 * | 4/2019 | Mostak | G09G 5/363 |
| 10,353,940 B1 * | 7/2019 | Carr | G06F 16/3326 |
| 12,073,180 B2 * | 8/2024 | Tunstall-Pedoe | G06F 40/279 |
| 12,086,141 B1 * | 9/2024 | Patil | G06F 16/24553 |
| 2003/0158842 A1 * | 8/2003 | Levy | G06F 16/24532 |
| 2004/0193656 A1 * | 9/2004 | Pizzo | G06F 16/24552 |
| 2005/0021511 A1 * | 1/2005 | Zarom | G06F 16/2471 |
| 2005/0289098 A1 * | 12/2005 | Barsness | G06F 16/24549 |
| 2007/0185841 A1 * | 8/2007 | Jones | G06F 16/951 |
| 2008/0168135 A1 * | 7/2008 | Redlich | G06F 16/282 |
| | | | 709/204 |
| 2009/0006450 A1 * | 1/2009 | Champion | G06F 9/4493 |
| | | | 707/999.102 |
| 2011/0072055 A1 * | 3/2011 | Swaminathan | H04L 67/51 |
| | | | 707/810 |
| 2011/0131241 A1 * | 6/2011 | Petrou | G06F 16/95 |
| | | | 707/E17.014 |
| 2014/0379690 A1 * | 12/2014 | Ahmed | G06F 16/24537 |
| | | | 707/713 |

(Continued)

*Primary Examiner* — Mark E Hershley
(74) *Attorney, Agent, or Firm* — PERRY + CURRIER INC.

(57)    ABSTRACT

A search engine receives a search request and determines a number of initial search results. The initial search results comprise at least one essential data piece and omit at least one non-essential data piece. Later on, a follow-up search request from the client is received which indicates at least one of the initial search results. The search engine computes at least one non-essential data piece for each initial search result indicated in the follow-up search request based on a number of dynamic computation rules and returns the computed at least one non-essential data piece for each initial search result to the client.

12 Claims, 10 Drawing Sheets

(56)          References Cited

U.S. PATENT DOCUMENTS

| | | | |
|---|---|---|---|
| 2016/0246842 A1* | 8/2016 | Li | G06F 16/24542 |
| 2017/0031982 A1* | 2/2017 | Johnston | G06F 16/9024 |
| 2017/0279805 A1* | 9/2017 | Diaz-Cuellar | H04L 63/20 |
| 2017/0329840 A1* | 11/2017 | McGowan | G06F 16/3323 |
| 2018/0357291 A1* | 12/2018 | Choi | G06F 16/2379 |
| 2019/0228094 A1* | 7/2019 | Aubry | G06N 3/006 |
| 2019/0354622 A1* | 11/2019 | Sheldon | G06F 16/2455 |
| 2020/0145310 A1* | 5/2020 | Lodhia | H04L 67/5681 |
| 2021/0149897 A1* | 5/2021 | Kim | G06F 16/24535 |
| 2021/0173746 A1* | 6/2021 | Shaull | G06F 11/1458 |
| 2021/0365456 A1* | 11/2021 | Kondiles | G06F 16/2462 |
| 2023/0132072 A1* | 4/2023 | Tunstall-Pedoe | G06F 40/226 |
| | | | 704/9 |
| 2023/0214430 A1* | 7/2023 | Yun | G06F 16/2457 |
| | | | 707/706 |
| 2023/0274086 A1* | 8/2023 | Tunstall-Pedoe | G06F 40/20 |
| | | | 704/9 |
| 2024/0143595 A1* | 5/2024 | Bove | G06F 16/24553 |
| 2024/0291708 A1* | 8/2024 | Panwar | G06F 16/26 |
| 2024/0403293 A1* | 12/2024 | Park | G06F 16/24544 |
| 2024/0411815 A1* | 12/2024 | Saupe | G06F 16/24532 |
| 2025/0147967 A1* | 5/2025 | Vellay | G06F 16/2425 |

* cited by examiner

| ID | Parameter 1 | Parameter 2 | Parameter 3 | Parameter 4 | Parameter 5 |
|----|-------------|-------------|-------------|-------------|-------------|
| 1  | AAA         | BBB         | 563         | 39          | 0           |
| 2  | SUP         | GHI         | 815         | 234         | 1           |
| 3  | POI         | ZTR         | 514         | 76          | 2           |
| 4  | DEF         | BVC         | 667         | 43          | 2           |
| 5  | EIN         | MLP         | 811         | 66          | 1           |
| 6  | CET         | DAX         | 913         | 10          | 0           |

FIG. 4

SEARCH REQUEST PROCESSING

FIELD

This disclosure generally relates to information technology. More specifically, the disclosure relates to processing search requests in an information technology search environment such as a database system.

BACKGROUND

Search systems in information technology face increased level of complexity and volume. Search request traffic continuously and quality-of-service requirements increase at the same time. Search request processing also may feature dynamic computation of search results at search request times. In distributed search systems, search results or underlying computation data may also be retrieved from distributed data sources. Higher standards of quality of service such as short response times cannot solely be maintained by more performant hardware.

Hence, generally, methodologies are sought which facilitate efficient processing of search requests.

SUMMARY

The present mechanisms are set forth by the independent claims.

According to a first aspect, a method for processing a search request is provided. The method is performed in a computing platform such as a search engine handling the search request. The method includes receiving, at the search engine, a search request from a client. The search request indicates at least one search parameter. The search engine determines a number of initial search results. The initial search results comprise at least one essential data piece which corresponds to the at least one search parameter and omit at least one non-essential data piece. The search engine returns at least a subset of the initial search results to the client. Later on, a follow-up search request from the client is received which indicates at least one of the initial search results in the subset of the initial search results. The method further comprises computing at least one non-essential data piece for each initial search result indicated in the follow-up search request based on a number of dynamic computation rules and returning the computed at least one non-essential data piece for each initial search result to the client.

In some embodiments, computing the at least non-essential data piece requires an amount of computation resources above a given threshold.

Some embodiments further comprise determining to omit the at least one non-essential data piece based on a current state of the search engine.

In some embodiments, the current state of the search engine comprises one or more of a number of search requests received within a given time interval, an amount of computation resources recently spent, a number or ratio of external data sources recently contacted, an amount of memory currently utilized, a current network load measure.

In some embodiments, the initial search results returned to the client include an indication that the at least one non-essential data piece omitted in the initial search results are available in response to the follow-up search request.

Some embodiments further comprise computing at least one non-essential data piece for each initial search result indicated in the follow-up search request based on a number of dynamic computation rules at least partly occurs in a time after returning the initial search results to the client and before receiving the follow-up search request.

Some embodiments further comprise providing, to the client, the number of dynamic computation rules to enable to client to compute the at least one dynamic data piece for each initial search result.

Some embodiments further comprise determining the at least one non-essential data piece to be omitted from the initial search results based on previous follow-up search requests.

Some embodiments further comprise computing the at least one dynamic data piece for each initial search result indicated in the follow-up search request is performed by a further computing platform outsourced from the search engine.

In some embodiments, the follow-up search request includes an identifier per at least one of the initial search results in the subset of the initial search results, and the method further comprises: storing at least the returned subset of the initial search results in a memory; retrieving, using the identifier, the initial search results indicated in the follow-up request from the memory; computing the at least one dynamic data piece for each initial search result indicated in the follow-up search request based on the respective at least one essential data piece of the initial search results retrieved from the memory.

In accordance with a second aspect, a search system is arranged to perform any one of the aforementioned method aspects and embodiments. The search system may include a search engine which processes search requests.

In accordance with a third aspect, a computer program product comprises a computer-readable medium storing program code which executes any one of the aforementioned method aspects when run by a computer.

In accordance with a fourth aspect, a computer program is provided which makes one or more processors of a computer to execute any one of the aforementioned method aspects when the computer program is run on the computer.

Further refinements of the aspects and embodiments are set forth by the description.

BRIEF DESCRIPTION OF THE FIGURES

Aspects and examples of the present disclosure are described with reference to the following figures, in which:

FIG. 4 depicts an exemplary set of search results.

DETAILED DESCRIPTION

The present disclosure addresses a technical problem in information technology and database technology, and more specifically in search systems which process search requests from a client. A search request sent by and received from a client includes one or more search parameters, i.e. one or more parameter-value pairs, which indicate a strict or fuzzy search space limitation. The search system typically includes one or more search engines, i.e. a computerized platform or machine, equipped with hardware and software to process the search request, take measures to identify search results corresponding to the search parameters and returning, if at least one search result has been identified, the at least one search result to the requesting client.

Figure 1:
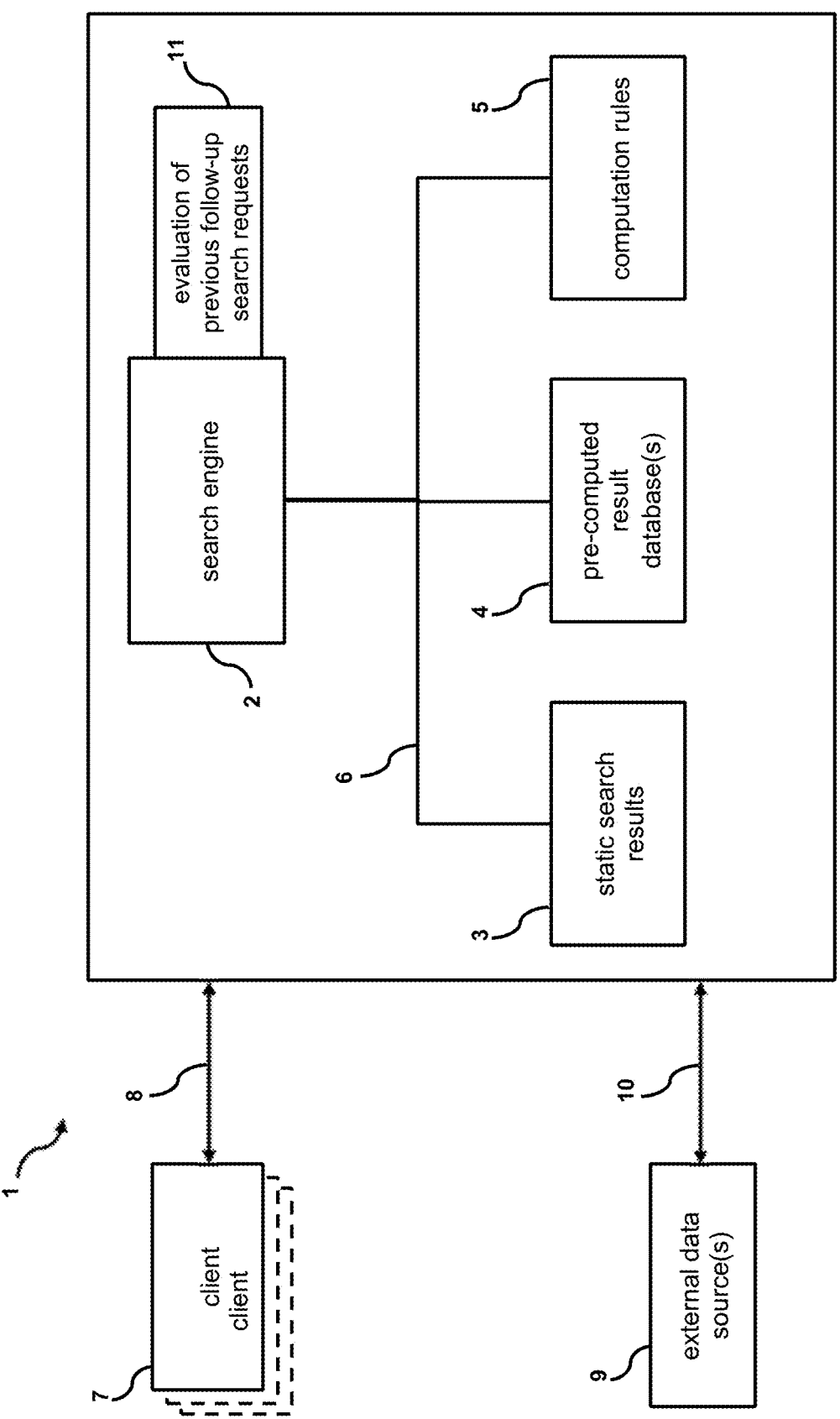
FIG. 1 schematically shows an exemplary search system implementing the present methodologies.

A typical, simplified and schematic search system 1 is shown by FIG. 1. The search system 1 includes the search engine 2 which is communicatively coupled to one or more clients 7 over a communication interface 8. The communication interface 8 may utilize any sorts of communication technology such as wired and/or wireless communication and/or mobile communication networks, one or more local area network, and/or one or more wide area networks such as the Internet, as well as any sorts of communication protocols such as mobile communication networks, WiFi, Ethernet, Internet Protocol (IP), Transport Control Protocol (TCP), Hypertext Transfer Protocol (HTTP) and others. Search requests from the client(s) 7 and responses to the search requests are sent over the communication interface 8.

Typically, the search engine 2 may also have access to internal data sources which may be geographically and/or operationally co-located (as visualized by the outer box in FIG. 1, e.g. part of a local area network or virtual local area network) with the search engine 2. For example, the search engine 2 may be communicatively coupled, via a further communication interface 6, to one or more databases 3 storing static search result data and caches such as pre-computed result database(s) 4. Typically, such pre-computed result database(s) 4 may provide access to pre-computed search results in an efficient way in terms of computation resources and network load, but there may be a possibility that one or more of the pre-computed search results are outdated at the time of retrieval by the search engine 2. The static result database(s) 3 may be employ any suitable database model such as a relational database, an object-oriented database, a document-oriented database, and others, as well as mixed types such as an object-relational database. The static result database(s) 3, if present, may typically store non-dynamic data which is valid for a longer period of time and can be retrieved with little overhead.

On the other hand, the search engine 2 may also be capable of computing search results dynamically in response to receiving a search request. To this end, for example, the search engine 2 accesses a database including computation rules 4 as well as a data source including underlying data for dynamically computing one or more search results using the computation rules, such as dynamic database(s) 5. A non-limiting, purely illustrative example is the computation of a price of a travel offer based on fares, wherein the fares are determined in correspondence with at least a part of the search parameters. Typically, such dynamic computation is more costly in terms of computation resources, response time and network load compared to retrieving a number of cached search results from the static result database(s) 3 or from the cache(s) 4.

A further way to dynamically determine search requests (data pieces) is generative artificial intelligence (generative AI) which utilizes generative models to generative content such as a textual, graphical, video, music and/or speech-based description corresponding to search requests parameters. Generally, generative AI models learn patterns and structure of input training data and then generate new data with similar characteristics. Generative AI mechanisms may utilize a range of artificial neural networks such as models with transformer neural networks (e.g. for large language models) and generative adversarial networks (GAN). For reasons of simplicity, optionally utilized generative AI mechanisms are shown as part of box 5 in FIG. 1.

At still another level, the search engine may be interconnected to one or more external data sources 9, via still a further communication interface 10. The external data source may provide other or further search result corresponding to the search parameters. Again, an external data source may respond with cached/pre-computed search results and/or search results dynamically computed at request time.

These different ways to determine one or more search results are not mutually exclusive, but may be employed in parallel, in sequence, or in a combined manner. For example, the search engine 2 may retrieve underlying data from an external data source 9 to populate or update the underlying data held in the dynamic database(s) 5 and then dynamically compute a number of search results using computation rules 4 and the underlying data in the dynamic database(s) 5. A non-limiting, purely illustrative example concerns availability of items in a web shop sought by a search request. The current availability of the items may first be determined by contacting the provider of the times, i.e. the external data source(s) 9. Insofar the items are available, the current price and delivery time is calculated by the search engine 2 using computation rules 4 previously and asynchronously provided by the providers.

Hence, processing search requests at the search engine 2 may utilize different ways to process a search request which are heterogenous in terms of processing or computation resources. This particularly applies to the search results in a vertical manner. Typically, search results are composed of multiple data fields, each of the multiple data fields containing a (one or more) parameter-value pair. In other words, a search result may form an array of multiple fields. The value(s) of a data field or parameter is also referred to as data piece hereinafter. For example, the search request may ask for a list of streets in a specific city and each search result represents a street with data corresponding to the search parameters such as the city and further characteristics such as a street length as well as further parameter-value pairs such as the name of the street, the length, the width, and e.g. current traffic load, a current status (e.g. closed due to construction work), and so on. The data structure of a search result may also be hierarchical, e.g. a data field at the highest level may again include an array of multiple data fields at a lower level. The data of the different data fields, i.e. the different data pieces, may originate from different sources as explained above. For example, data pieces determined dynamically by utilizing generative AI mechanisms may be more demanding in terms of processing resources (latency, limited number of tokens per minutes, graphical processing unit, GPU, resources) then retrieving static data from a relational or object-based database. As a consequence, processing resources may vary in order to determine the parameter-value pairs for the various data fields.

In addition, depending on the specific use case, data fields and corresponding data pieces may be mandatory/essential or optional/non-essential. The terms mandatory and essential denote that search request/response protocols specifies such data pieces have to be included in an initial search response for the search request, whereas the terms optional and non-essential denote that the search request/response protocol allows to omit such data pieces from an initial search response. For example, the search request may indicate which data fields are mandatory for the requesting client and are to be included in the search response (cf. example of FIG. 4 further below). The search request may also indicate (explicitly or implicitly) data fields that are optional, i.e. which may be returned by the search engine, but which could also be omitted. Whether a data field is essential or non-essential may also be defined statically at the search engine 2. In some embodiments, the search engine 2 may also dynamically determine, e.g. at search request time, which data fields of the search results are essential and which are non-essential. Differentiation between essential and non-essential data fields and corresponding data pieces may also relate to computation resources required to determine the data pieces and/or computation resources available to the search engine 2.

In this context, the technical problem addressed by the present methodologies is to render processing search results more efficiently, given the aforementioned complexity and degrees of freedom to determine search results corresponding to the search request using the heterogeneous data sources available to the search engine 2.

Solutions are provided in form of methods, systems, apparatuses, computer-readable mediums, computer-program instructions, computer programs etc. for processing a search request. Generally, the present methodologies utilize an incremental approach to determine and return search results according to which, at a first processing stage, the search engine limits the computation resources to determine the essential or mandatory data pieces of search results which fulfil constraints set by the search parameter(s), while omitting, at this first stage, determination of any non-essential or optional data pieces and thus, at this stage, save computation resources for determining non-essential data pieces. At the same time, response times may be decrease as determining essential data pieces may be achievable more rapidly than determining both, essential and non-essential data pieces at this stage. As an effect, the initial search response to a search request may be mainly limited to the essential data pieces and may only optionally include one or more non-essential data pieces.

Non-essential data pieces are generally determined at a later, second stage depending on a certain trigger. The trigger may include a follow-up search request which makes reference to the earlier search request and indicate one or more of the search results returned at the first stage. The trigger may also include an availability of computation resources, e.g. the search engine 2 may have computation resources available after having returned the essential data pieces to the client with the initial search response and before the arrival of a follow-up search request. In such situation, the search engine 2 may utilize these available computation resources to determine the non-essential data pieces, store these non-essential data pieces in a cache 4 and retrieve the non-essential data pieces from the cache in the event of the follow-up search request. This may promote response time also for processing a follow-up search request.

Figure 3:
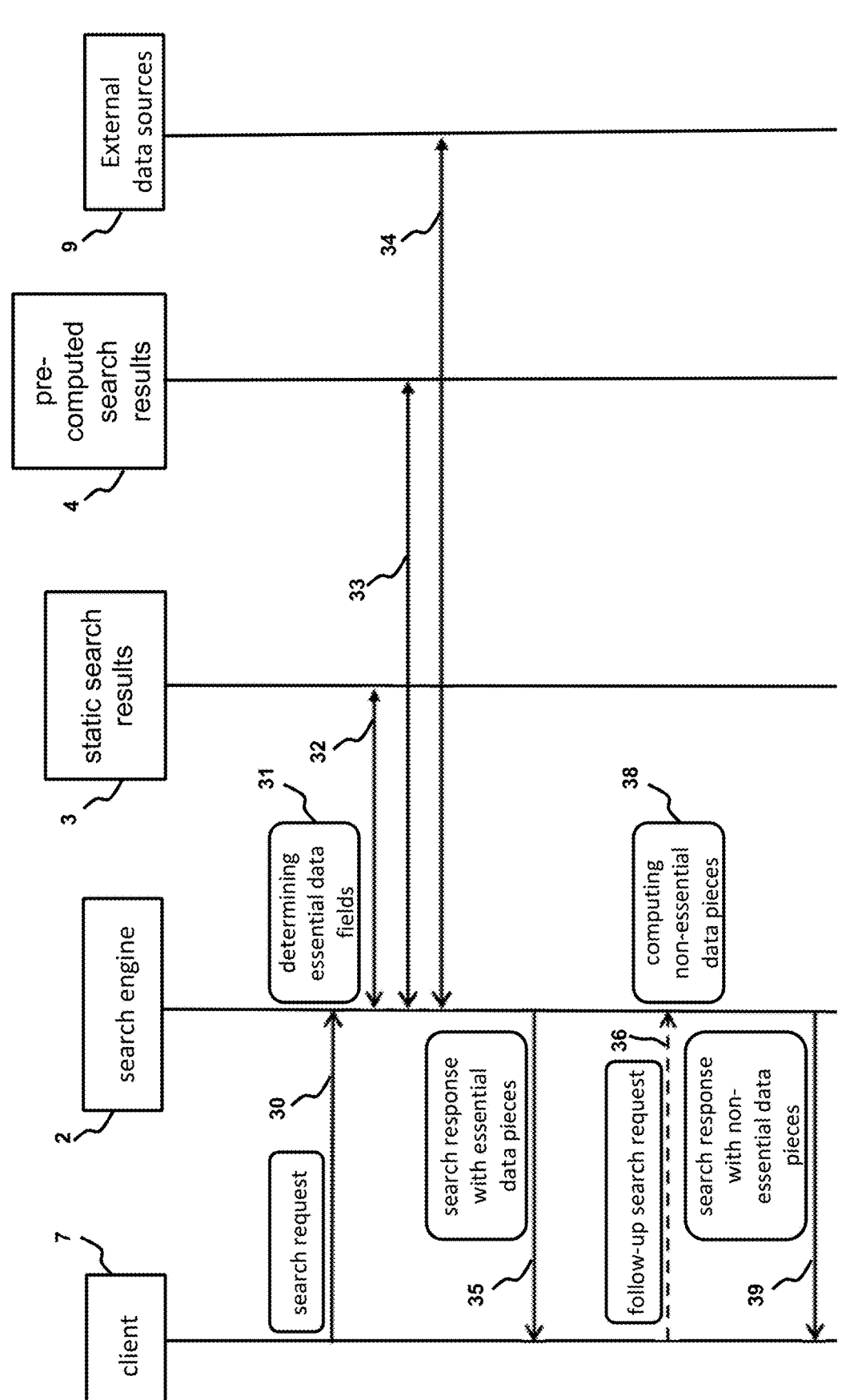
FIG. 3 visualizes a message sequence utilized by a search engine.

The methodologies are executed at the search engine 2 for a search request received from a client 7, such as search request 30 shown in FIG. 3. Hence, the methodologies are applied for an individual search request and at search request time. The search request may be realized by and according to any suitable search request protocol such as structured database query protocols, application request/response protocols, web-based request/response protocols, etc. The data structure of the search request may include a header portion indicating control data such as a request type, an indication of the requesting client, an indication of one or more quality of service requirements, and so on, as well as a payload portion containing a number of search parameter-value pairs.

Figure 2:
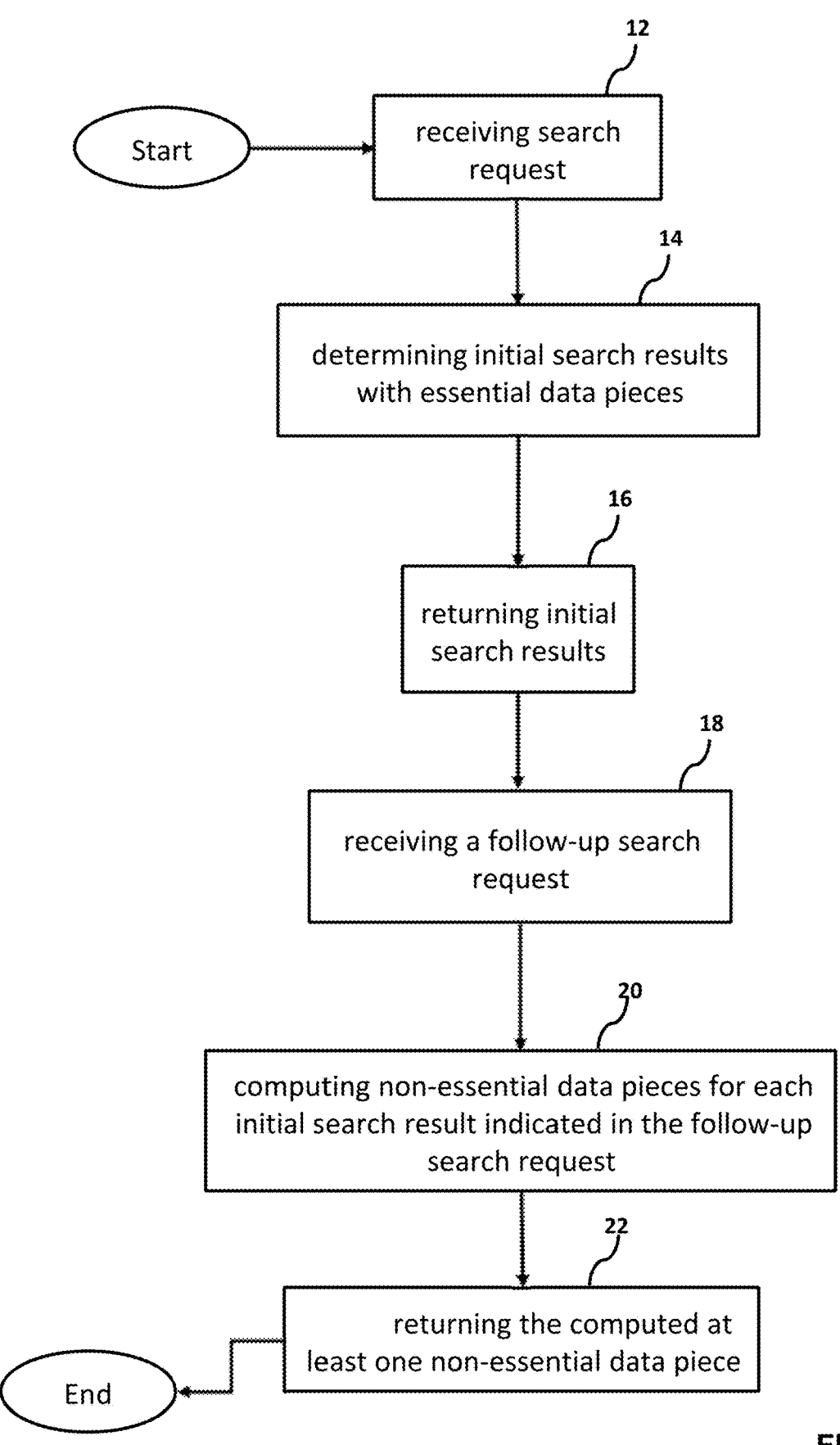
FIG. 2 is a flowchart presenting activities of the methodologies described herein.

FIG. 2 summarizes the present methodologies still at a more general level by way of a flow chart. The procedure starts by the search engine 2 receiving 12 a search request from a client 7. the search request indicates at least one search parameter. The indication may be given explicitly, i.e. by stating one or more key-value pairs. The value may be a specific value, a value range (wherein the range may be open at the upper or lower end), a fuzzy indication or the like.

The search engine 2 processes the search request by determining 14 a number of initial search results with data pieces which fulfil the search parameter(s). As a minimum, the initial search results include at least one essential data piece which corresponds to the at least one search parameter. For example, for the search parameter(s) indicated in the search request, the search results are defined to include five data pieces (e.g. data fields with parameter-value pairs). Three of these six data pieces may be defined to be essential, while the remaining two data pieces are defined to be non-essential. For two of the three essential data pieces, the search request indicated a respective search parameter. In such example, the search engine determines e.g. ten search results which fulfil the two search parameters, namely the three essential data pieces for each of these ten search results. The two remaining non-essential data pieces are not yet determined by the search engine 2 at that point, i.e. the search engine 2 omits at least one non-essential data piece of the search results, thereby sparing the corresponding computation resources for such determination for the time being. In this sense, the determined search results (as well as the search response) are initial as the non-essential data pieces are not yet determined and not included in the search response.

Afterwards, the search engine returns 16 at least a subset of the initial search results to the client by way of an initial search response. For example, the client 7 has only requested six search results, so the search engine 2 may determine a subset of six search results out of the determined ten initial search results, include these six initial search results in the search response and then transmit the search response via the communication interface 8 to the client 7.

At some point of time, the search engine 2 receives 18 a follow-up search request from the client 7. The follow-up search request is related to the earlier search request as follow-up search request indicates at least one of the initial search results in the subset of the initial search results which were previously returned 16 to the client. The indication of the initial search results may be facilitated by using identifiers (IDs). For example, the search engine 2 may buffer the returned initial search results and the returned initial search results may include IDs which uniquely identify the returned initial search results among all currently buffered search results. In such example, the client 7 may indicate one or more IDs in the follow-up search request, thereby identifying one or more of the initial search results. For example, the client 7 may indicate three out of the previously received six initial search results.

The follow-up search request may serve different functional purposes. For example, the follow-up search request may constitute a client selection, indicating which of the initial search results are to be further processed by the search system 1. The follow-up search request may also be a request for further data pieces, i.e. the non-essential data pieces not yet provided with the response 16. Additionally or alternatively, the follow-up search request may also be a request for an update of the previously returned initial search results.

The search engine computes 20 at least one non-essential data piece for each initial search result indicated in the follow-up search request. Typically, the computation goes beyond a mere data retrieval from a static database, but involves dynamic computation using on a number of dynamic computation rules. For example, determining the one or more non-essential data pieces comprises retrieving raw data from the external data sources 9 and computing result data pieces using the dynamic computation rules. Non-limiting and purely illustrating examples of such dynamic computations are determination of volatile data such as current traffic load, price calculation, availability determination, etc. as well as generating data pieces by way of generative AI mechanisms such as large language models, e.g. a description of possible activities at a location indicated in the search request. With reference to the specific example, the search engine 2 may determine the two remaining non-essential data pieces for all three initial search results indicated in the follow-up request.

Next, the search engine 2 returns 22 the at least one non-essential data piece for each initial search result to the client 7. The search engine 2 may return the non-essential data pieces, but not (again) the essential data pieces. This may be implemented by using the IDs, e.g. the search engine 2 may include the aforementioned IDs to indicate which non-essential data pieces is associated with which of the initial search results, and the client 7 may form completed search results e.g. by aggregated the essential data pieces and non-essential data pieces with the same ID. Alternatively, the search engine 2 may also return 22 the complete search results, i.e. essential and non-essential data pieces. In this situation, the previously returned essential data pieces may also be updated by the search engine 2 and the return activity 22 may include an updated version of the essential data pieces. In a mixed form, the search engine 2 may include some, but not all of the essential data pieces in the response to the follow-up request. For example, such essential data pieces which have changed in the time window between returning 16 the initial search results and receiving 18 the follow-up request may be included, while other essential data pieces which have not changed in the meantime are omitted, as they are already available at the client 7.

The general mechanisms of the present disclosure can be discussed with reference to the message sequence chart of FIG. 3 which visualizes various activities for handling a search request in a complimentary manner to FIG. 2. The client 7 issues a search request 30 which is received by the search engine 2. The search engine 2 processes the search request 30 according to the methodologies discussed herein.

In response to receiving 30 the search request 30, the search engine 2 determines 31 which data pieces are to be retrieved/computed in order to prepare a response to the search request 30. Determining 31 may include first determining all the data fields of search results called for by the search request 30 and then determining which of the data fields are categorized as essential and thus have to be included in the response to the search request 30 and which are categorized as non-essential and thus corresponding data pieces may be omitted from the response to the search request 30. At this stage, search request processing of the search engine 2 focuses on the essential data pieces, i.e.

available computation resources are mainly to be spent for determining values of essential data pieces as opposed to non-essential data pieces.

Determining 31 the essential data fields may be relatively static or dynamic. For example, a static configuration of the search engine may prescribe which data fields are essential and which are non-essential, or essential data fields may be indicated in the search request 30 as search parameters. In some embodiments, determining 31 may be more sophisticated and adaptive depending on feedback from previous search requests, current load of the search engine, an analysis of the search parameters in the search request 30, etc. Exemplary implementations how to determine 31 the essential data fields will be explained further below.

Once the search engine 2 has determined which data fields (parameters) are to be included in the response to the search request 30, the search engine 2 determines the data pieces (values, content) for the response. To this end, the search engine 2 may retrieve 32 data from the static search results database 3, retrieve 33 data from the pre-computed search results database 4 (cache), and/or retrieve 34 data from external data sources 9. In addition, preparing the essential data pieces may also involve dynamic computation and further processing. For example, data retrieved from multiple sources 3, 4, 9 may be further processed (e.g. aggregated, calculated by way of rules, decorated by other retrieved data, and so on).

As further explained below, determining values for some of the non-essential data fields is not excluded at this point, in particular if the search engine 2 has additional free computation resources. However, if computation resources are currently limited, the search engine may limit processing the search request 30 to the essential data pieces and omit all of the non-essential data pieces at this point. The resulting values of essential data pieces and, optionally, some of the non-essential data pieces form a number of initial search results.

When the search engine 2 has determined a suitable number of essential data pieces to form a suitable number of initial search results, the search engine 2 forms a search response 35 including initial search results with the essential data pieces and returns the search response 35 to the client 7. The search response 35 may include multiple messages. For example, the search engine 2 may return the initial search results incrementally dependent on the times when the initial search results are determined by the search engine 2. For example, search results determined by utilizing the pre-computed result database(s) 3 may be available for transmission to the client 7 earlier than search results determined by retrieval 34 from the external data sources 9.

Optionally, the search engine 2 buffers the returned initial search request in order to be able to retrieve them again in the event of a follow-up search request. Furthermore, the search engine 2 may also buffer the results of the determination 31 of the essential data pieces which may indicate which non-essential data pieces are still outstanding to be provided to the client 7 in the event of a follow-up search request.

The search engine 2 receives a follow-up search request 36 from the client which indicates at least one of the initial search results returned with the search response 35. At the latest after reception of the follow-up search request 36, the search engine computes the non-essential data pieces which have not yet included in the search response 35 before. Computation of the non-essential data pieces may involve again contacting any relevant data source such as data retrieval from the static search results database 3, from the pre-computed search results database 4, any external data source 9, but also some dynamic computation using computation rules and/or utilizing generative AI methods 5. Hence, typically, at least some of the non-essential data pieces incur more computation resources than preparing essential data pieces. Thus, a deferred preparation of non-essential data pieces has a staggering and distributing effect on the computation or processing resources of the search engine 2 which may allow a more efficient utilization of the limited computation resources of the search engine 2 globally.

The follow-up search request 36 may e.g. concern a search for search results related to the selected one or multiple search results, e.g. an upsell transaction, a gift packaging, an add-on purchase, or the like, or a follow-up process such as a download, upload or write, booking, purchase, reservation, payment, or any other process relating to the one or more selected search results. Such follow-on process may also be handled by another entity of the system 1 or even by an entity outside system 1, such as a reservation engine, a payment server, a secondary search engine, or the like, herein also referred to as computing platform. Hence, the client selection 22 may also be directed to such other entity within or outside the search system 1.

Once the non-essential data pieces are computed 38, the search engine forms a search response with the non-essential data pieces and returns the search response 39 to the client 7.

In some embodiments, computing the at least non-essential data piece requires an amount of computation resources above a given threshold. In such embodiments, an amount of computation resources to be used in order to retrieve/compute the data pieces for responding to the search request 30 may control which data piece(s) are defined to be essential and which data piece(s) are defined to be non-essential. In particular, such data pieces the computation of which requires computation resources below the threshold may be defined as essential data pieces, while data pieces which require computation resources above the threshold may be defined as non-essential data pieces.

It is, however, to be noted that such computation-resource-driven determination 31 of the essential and non-essential data pieces is typically not the sole criteria for the determination 31. In a possible scenario, some of the data pieces may be statically defined to be essential, irrespective of the amount of computation resource required to prepare them. Hence, in response to the search request 30, the search engine 2 determines these data pieces in any event and will include these in the search response 36. Among the remaining data pieces which are not statically declared to be essential, the search engine 2 may have freedom to utilize the computation-resource-driven criteria to determine which of these remaining data pieces are essential and which are non-essential for processing the current search request 30. As the amount of computation resources to be used for the remaining data pieces may also vary over time (for example, one of the remaining data pieces requires data retrieval from an external data source 9 and the load of this external data source or network bandwidth may sometimes be higher and sometimes be lower), the computation-resource-driven determination 31 may have a dynamic character.

This mechanism is visualized by way of the example of FIG. 4 which shows an exemplary set of pseudo search results. Each search result includes five data fields or data pieces with respective values as well as an ID. For example, the search request 30 may have asked for at three search results with the smallest values for Parameter 3, wherein Parameter 3 shall have values below 1000 and Parameter 5 a value smaller than 3. According to traditional search procedures, the search engine 2 would have retrieved, collected, prepared and/or computed the complete six search results shown by FIG. 4 and e.g. returned the search results with IDs 3, 1 and 4 to the client 7 with the search response 35.

According to the present methodologies, the search engine 2 first determines that the search results called for by the search request 30 will be finally composed of the five parameters 1-5, and the determines 31 which of these five parameters are defined to be essential and which are defined to be non-essential for the search response 35. For example, The presence of search parameters 3 and 5 in the search request 30 indicates to the search engine 2 that these two data pieces are considered to be essential by the client 7. Accordingly, the search engine 2 earmarks Parameter 3 and Parameter 5 to be essential for the initial search response 35.

In addition, the search engine 2 determines the current computation resource requirements for determining any one of the remaining data pieces of Parameters 1, 2 and 4. For example, the search engine 2 estimates that determining the data pieces of Parameters 1 and 2 takes about 5 seconds, while determining the data pieces of Parameter 4 is significantly faster and only requires about 100 milliseconds. An addition, the search engine 2 may maintain a computation resource threshold which controls if a data field is specified to be essential or non-essential. For example, the computation resource threshold may be set to 200 milliseconds, i.e. data fields requiring processing time of 200 milliseconds or less are specified to be essential, while data fields requiring more processing time are categorized to be non-essential. In the example of FIG. 4, the search engine 2 thus determines that Parameters 3, 4 and 5 are essential and the data pieces (values) of Parameters 3, 4 and 5 are to be determined for preparing the search response 35. Parameters 1 and 2 are determined to be non-essential and the data pieces of Parameters 1 and 2 are therefore not determined for responding to the search request 30, but omitted from the initial search response 35. Hence, in the example of FIG. 4, according to the present methodologies, the initial search response 35 includes the initial search results with IDs 3, 1 and 4, with the data pieces of Parameters 3, 4 and 5, but without the data pieces of Parameters 1 and 2.

Figure 5:
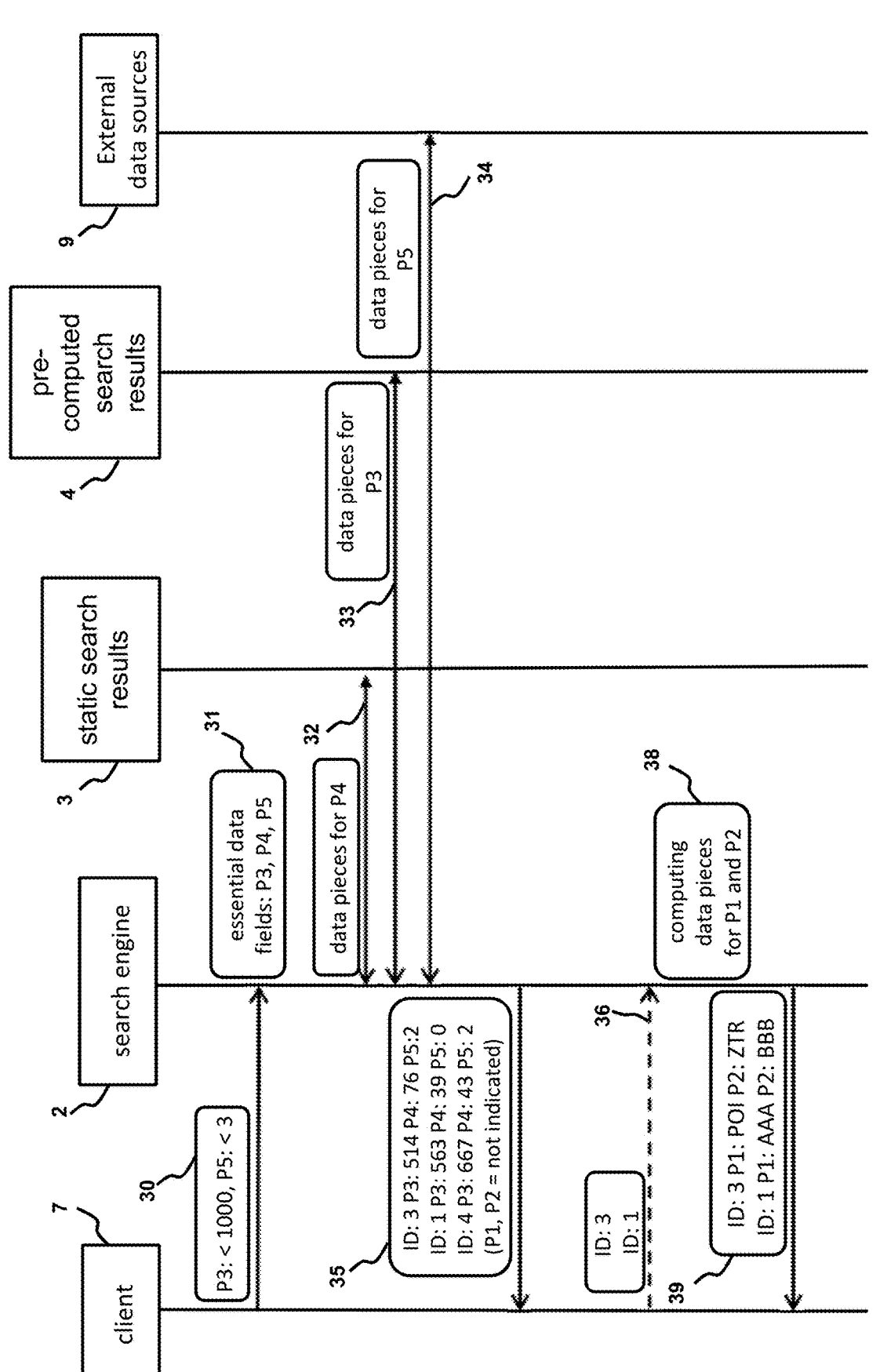
FIG. 5 shows an example of a two-staged search procedure as described herein.

FIG. 5 transfer the example of FIG. 4 to a message sequence chart in the way of FIG. 3. As shown by FIG. 5, the search request 30 of client 7 requests search results with Parameter 3 values smaller than 1000 and Parameter 5 values smaller than 3. The search engine 2 determines 31 that the essential data fields for the initial search response 35 are Parameters 3, 4, 5 as described above. The search engine 2 then determines the data pieces for the essential data fields. For example, the data pieces of Parameter 3 are stored in the pre-computed search results database 4 and are retrieved 33 from there. The data pieces for Parameter 5 are not stored in the search system 1, but are retrieved 34 by the search engine 2 from one or more external data sources 9. The data pieces for Parameter 4 are stored in the static search results database 3 (and are thus available quickly) and are retrieved 32 from there. The search engine determines then assembles the retrieved data pieces into initial search results (FIG. 4, parameters 3, 4 and 5 with respective IDs), determines which of the initial search results are to be returned to the client 7 (IDs 3, 1, 4), forms the initial search response 35 and returns the initial search response to the client 7.

The client 7 may then transmit a follow-up search request 36 representing a selection of two of the initial search results, such as IDs 3 and 1. This may trigger computation 38 of the non-essential data pieces for these two search results. Hence, the search engine 2 looks up the two initial search results with IDs 3 and 1 which have been buffered before, determines that the non-essential data pieces for Parameters 1 and 2 are still outstanding and computes these non-essential data pieces. This computation 38 may include retrieving data from one or more of the various data sources 3, 4, 9, and applying a number of computation rules 5 to calculate the values for Parameters 1 and 2. The search engine 2 then assembles the computed non-essential data pieces into a follow-up search response 39 and returns the follow-up search response 39 to the client 7.

In some embodiments, the initial search results returned to the client include an indication that the at least one non-essential data piece omitted in the initial search results are available in response to the follow-up search request. Hence, in the example of FIGS. 4 and 5, the initial search response 35 may thus indicate that data pieces for non-essential Parameters 1 and 2 may still be available, but have not yet been included in the initial response 36, e.g. by stating in the initial search response 35 that parameters P1 and P2 are not indicated (as visualized by the brackets in FIG. 5, such indication in the initial search response 35 is an optional refinement and can also be absent). The client 7 is then aware that these non-essential data pieces can still be requested by a follow-up search request 36 and may be provided by way of the follow-up search response 39.

In some embodiments, determining to omit the at least one non-essential data piece is based on a current state of the search engine 2. The current state of the search engine 2 may refer to one or more of a number of search requests received within a given time interval, an amount of computation resources recently spent, a number or ratio of external data sources recently contacted, an amount of memory currently utilized, a current network load measure. As described above, determining 31 essential data fields and non-essential data fields controls which of the overall data fields and corresponding data pieces are to be included in the initial search response 35 (namely the essential data pieces) and which are omitted from the initial search response 35 (namely the non-essential data pieces). As also explained above, in some embodiments, such data fields which require more than a given amount of processing resources to determine/compute the corresponding data pieces may be defined to be non-essential data fields.

In addition or alternatively, the determination which data fields are essential or non-essential may also depend on the current load or currently free processing resource of the search engine 2 or other current technical characteristics within or outside the search system 1. Generally, in situations with heavy load or little available processing resources, the search engine 2 reduces the number of essential data fields, while in more relaxed current states of the search engine 2, the search engine 2 may determine that further data fields (e.g. such data fields for which data pieces can be determined efficiently, e.g. within a small amount of processing time) are essential for the current search response 35 and thus also retrieves/computes 32, 33, 34 data pieces for these data fields.

Figure 6A:
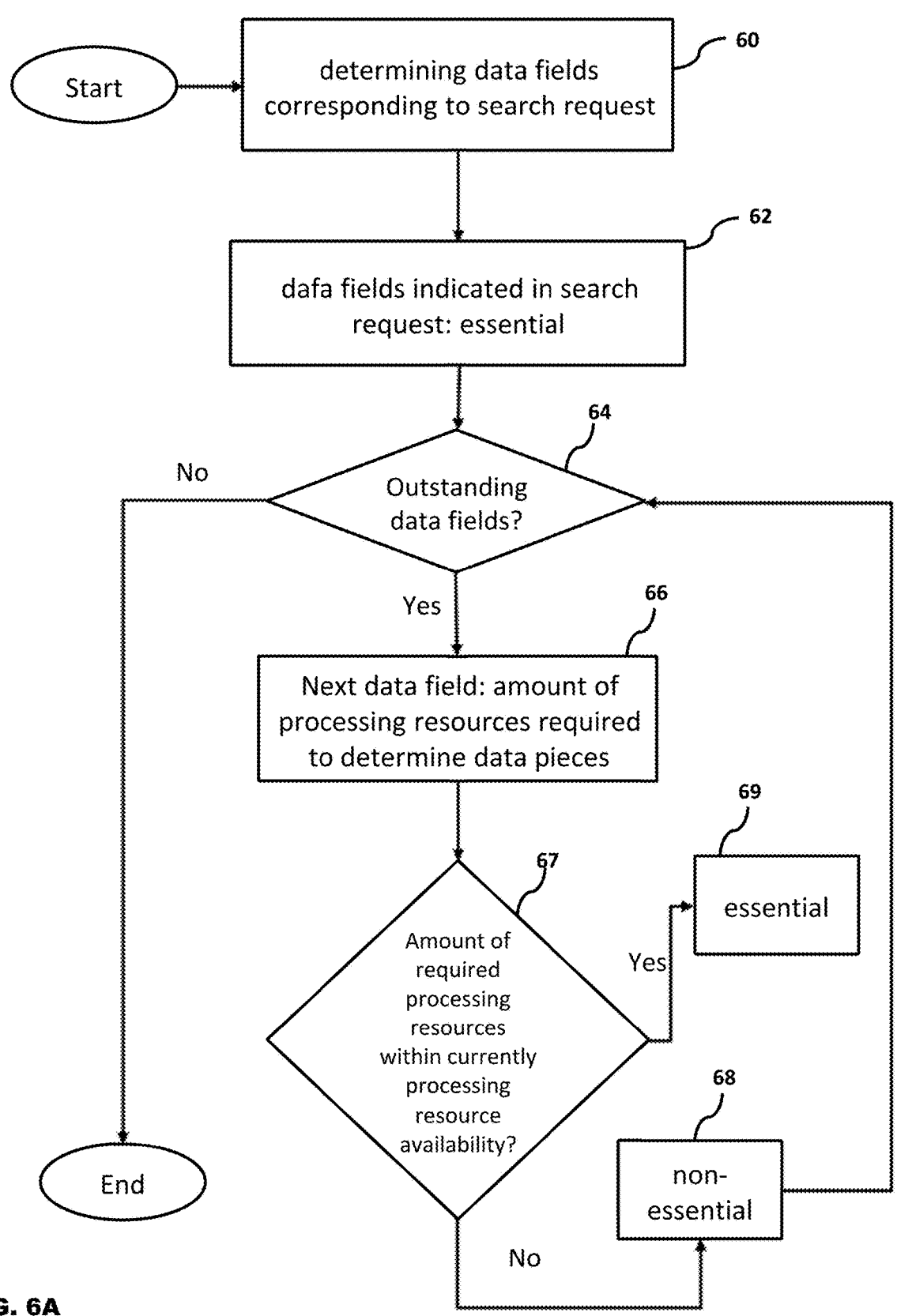
FIGS. 6A and 6B show optional refinements for determining essential and non-essential data fields.
Figure 6B:
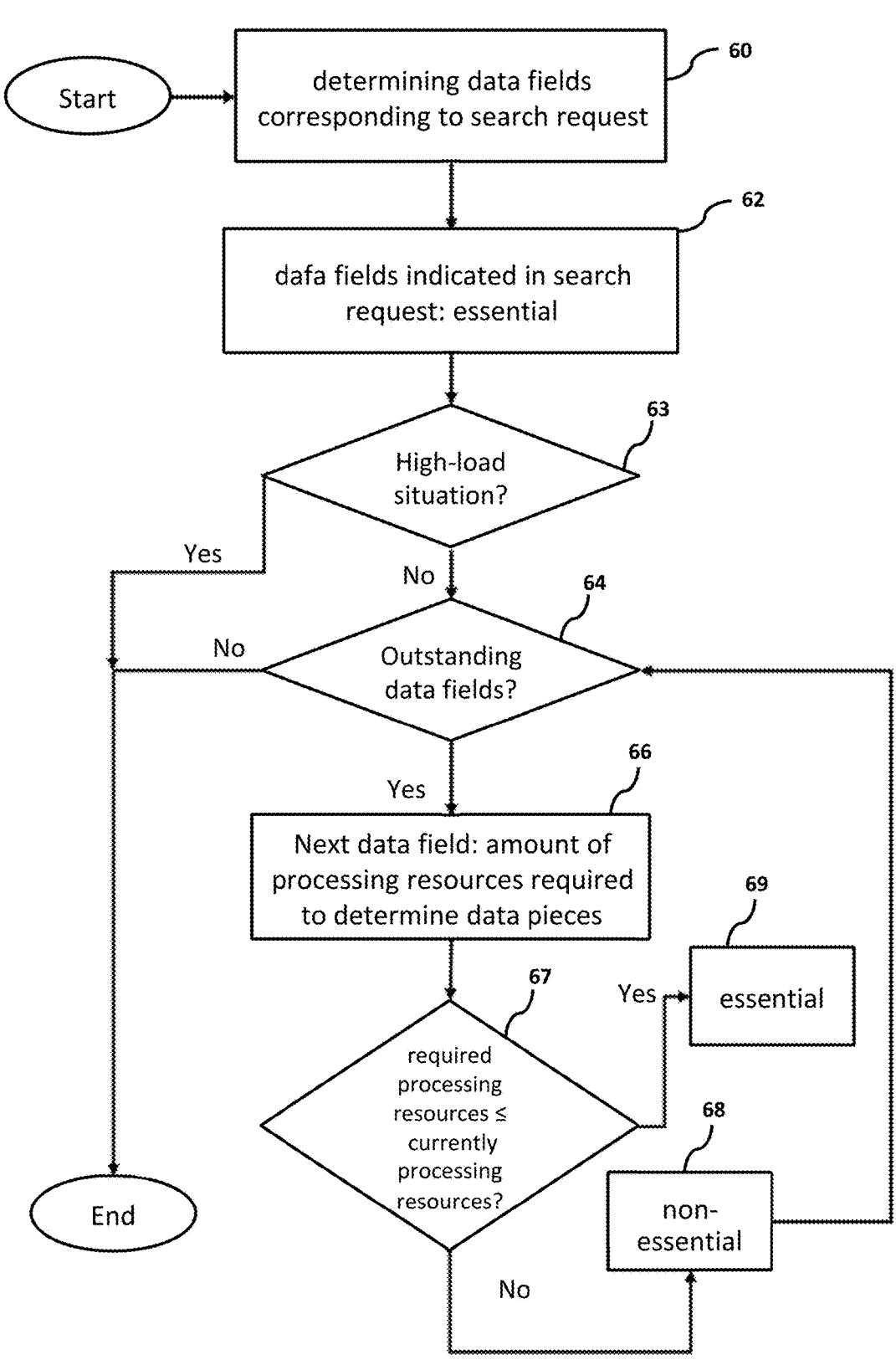

Exemplary implementations of taking account the current state of the search engine 2 when determining 31 the essential and non-essential data fields are given by FIGS. 6A and 6B. The procedure starts with a determination 60 which data fields are related to the search request 30, i.e. which data fields the (non-initial) search results for the search request 30 would include (see above, example shown by FIG. 4).

The search engine 2, for example, determines which data fields are explicitly indicated in the search request 30 and determines 62 these data fields to be essential, irrespective from the current state of the search engine 2 in terms of available processing resources or processing resources requires to determine corresponding data pieces (in the example of FIG. 4, Parameters 3 and 5).

Next, the search engine 2 iterates over the remaining data fields (in the example of FIG. 4, Parameters 1, 2, 4). As long as any data fields are outstanding to be determined (check 64, "yes"), the next data field is considered and the search engine 2 determines 66 an amount of processing resources to be used for determining data pieces for this data fields. Determining 66 the amount of processing resources may relate to any suitable dimension of processing resources, such as a certain number of processing instructions, a number of external data sources to be contacted, an amount of memory to be utilized, a network load measure caused by retrieving data for determining data pieces, and so on.

Next, for the current data field considered, the search engine 2 determines 67 an amount of available processing resources. Generally, both determinations 66 and 67 relate to the same, a similar or at least comparable dimension(s). Hence, assuming that determination 66 yields that determining data pieces for Parameter 4 may consume 100 Megabytes of volatile memory, determining 67 relates to the available amount of volatile memory. Still at 67, the search engine 2 then compares both determined figures and determines if the available processing resources are likely sufficient to meet the requirements of determining data pieces for the currently considered data field. If affirmative ("yes"), e.g. because currently 1 Gigabyte of volatile memory is available, the currently considered data field can be set to essential and the data pieces for this data field are the (later) determined for forming the initial search response 35. Otherwise, if the current processing resources of the search engine are insufficient ("no"), the currently considered data field is set to non-essential and the data pieces for this data field are not determined for the time being. After all data fields have been iteratively processed and, thus, no data field is outstanding (check 64, "no"), the procedure ends.

Note that the strictly iterative procedure of FIG. 6A may be further refined by considering pairs or tuples of data fields. For example, determining data pieces for two certain data fields may gain synergies in terms of processing resources such that declaring a second data field to be essential in addition to a certain first data field already having been declared essential may actually not incur any significant additional overhead. Hence, the iterations of FIGS. 6A and 6B may take into account which data fields have already been declared to be essential in previous iterations (or in activity 62) and may optionally also be executed for any combination of data fields which have not (yet) been declared to be essential.

In a variation of FIG. 6A, shown by FIG. 6B, the current state of the search engine 2 is taken into account for determining whether a data field is essential or non-essential for responding to the search request independent from the amount of processing resources required. This allows, for example, to base the decision whether a data field is defined to be essential or non-essential for the initial search response 35 on recent load or processing statistics of the search engine 2 or search system 1 which do not need to be strictly related to any processing resource requirements of determining data pieces for the data field considered. Non-limiting examples of such technical state dimensions are a number of search requests received within a given time interval, an amount of computation resources recently spent, a number or ratio of external data sources recently contacted. For any one of such dimensions, the search engine 2 may maintain a configurable threshold value. If one or more of such dimensions are currently above the threshold value, the search engine may determine 63 that the current load situation is higher and may thus e.g. determine the data fields indicated in the search request 30 to be essential (FIG. 6B, activity 62) and then determine that all remaining data fields are set to non-essential. In this way, the iterative processing of activities 66-69 in FIG. 6B may be skipped.

Figure 7:
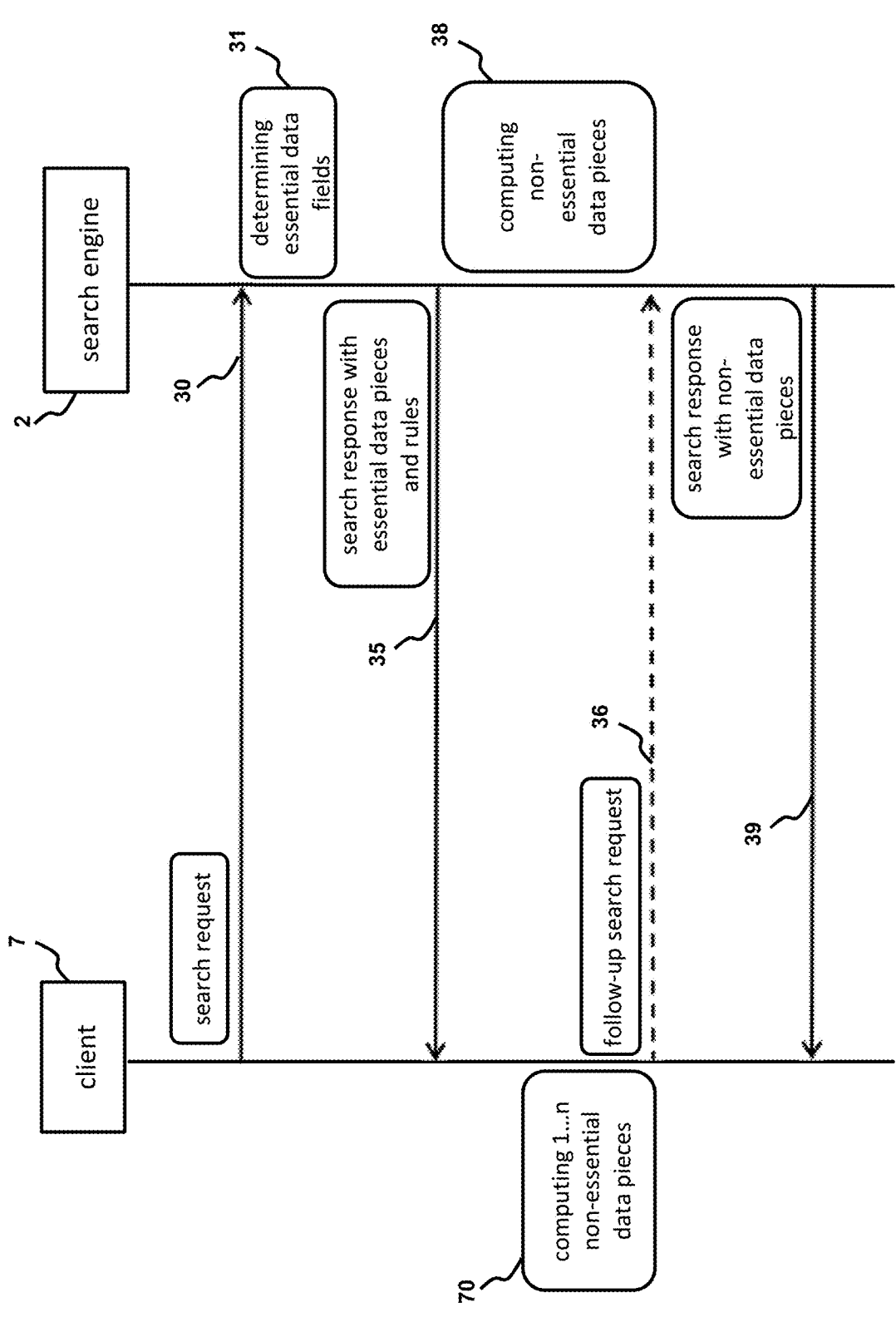
FIG. 7 relates to a partial offload functionality to compute non-essential data pieces by a client.

In some embodiments, computing at least one non-essential data piece for each initial search result indicated in the follow-up search request is based on a number of dynamic computation rules at least partly occurs in a time after returning the initial search results to the client and before receiving the follow-up search request (FIG. 7, activity 38). As already mentioned above, such functionality allows the search engine 2, e.g., to beneficially utilize any processing resources which may become available after having returned the initial search response 35 and before receipt of the follow-up search request 36. For example, as explained with reference to FIG. 6A, the amount of current processing resources may not be sufficiently to declare all data fields called by the search request 30 to be essential, i.e. at least one of the data fields is determined to be non-essential.

However, the current state of the search engine 2 may improve after the initial search response 35 has been sent as e.g. no immediate further search requests are received by the search engine 2. Hence, the search engine 2 may perform e.g. another iteration as shown by FIG. 6A over the non-essential data fields and determine if, during a time between the initial search response 35 and the follow-up search request 36, processing resources are sufficiently available to retrieve/determine/compute/generate one or more of the non-essential data pieces. Determination of the non-essential data pieces has been described above with reference to FIGS. 3 and 5 which also applies for the option to retrieve/determine/compute non-essential data pieces already before reception of the follow-up request 36. Typically, any non-essential data pieces retrieved/determined/computed before reception of the follow-up search request are stored in a cache such as the pre-computed result database(s) 4. In response to receiving the follow-up search request 36, the search engine 2 is then capable to retrieving the non-essential data pieces for the initial search results indicated in the follow-up request 36 quickly and spares processing resources at that point of time for e.g. processing other search requests.

Some embodiments enable the client 7 to compute non-essential data pieces for at least one of the non-essential data fields which have been omitted from the initial search response 35. In such embodiments, the search engine 2 may provide at least some of the number of dynamic computation rules to the client 7 (FIG. 7, initial search response 35) to enable to client to compute the at least one dynamic data piece for each initial search result. Typically, the dynamic computation rules 5 are readily available to the search engine 2 as the rules constitute relatively static data and are quickly accessible by the search engine 2. Depending on the particular use case, the client 7 may still require additional data beyond the dynamic computation rules 5 to compute 70 the non-essential data pieces. To obtain such additional data, the client may direct requests to one or more of the external data sources 9 where such data may be available. This may shift load from the search engine 2 to the client 7 and thus further relieve the search engine 2 from utilizing processing resources.

Some embodiments further comprise determining the at least one non-essential data piece to be omitted from the initial search results based on previous follow-up search requests. These embodiments utilize feedback from previous follow-up search requests from the same or other client(s) 7 in order to determine which data fields are to be non-essential for responding to the current search request 30. To this end, previous follow-up requests are tracked, monitored, and evaluated (FIG. 1, evaluation functionality 11). For example, data fields are that rarely requested by way of follow-up requests may be ranked down and more typically omitted from the initial search response 35, while data fields that are more regularly requested by way of follow-up requests may be promoted and typically be included in the initial search response, i.e. determined 31 to be essential. This may further reduce load of the search engine 2 as, at least in some occasions, follow-up requests 36 may be avoided altogether.

Ranking down such rarely-requested data fields may be combined with the iterative determination of activities 64 to 69 in FIGS. 6A and 6B. For example, ranking down a data field causes an ordering of the considered next data field in activity 64 to consider ranked-down data fields later than non-ranked down data fields. As a consequence, non-ranked down data fields may have a higher probability to be determined as essential data fields as the ranked-down data fields would not consume available processing resource beforehand.

To utilize conclusions from previous follow-up search requests, a feedback loop may be implemented by evaluation functionality 11, e.g. by way of machine-learning mechanisms such as one or more neural networks, including deep learning techniques and/or reinforcement learning models, in order to determine a likelihood for the present search request 30 which of the data fields may be requested in a follow-up search request 36 if those data fields are now omitted from the initial search response 35. To facilitate or train such machine-learning mechanism, a testing functionality may be provided according to which the initial search responses intentionally omit given data fields in order to (even if those data fields would actually be included in the initial search response 35 as the corresponding data pieces are e.g. computable with little overhead and/or the search engine 2 currently has sufficient processing resources available) verify if such data pieces are called in a follow-up search request 36. Such machine-learning mechanisms may also take into account and learn to assess processing resources required to determine data pieces for data fields based on the aggregation of and synergies between data fields and/or data pieces. For example, big data can be eventually less demanding in terms of processing resources than computing ten small and independent data pieces.

In embodiments, the feedback loop may feature regular classification machine-learning systems with decision trees based on historical data. Historical data may be collected by logging follow-up search requests with requested data fields and measurements of the processing resources utilized for computing the non-essential data pieces at follow-up search request time (e.g. response time, memory utilization, CPU resources, network load, etc.). These historical data may then be in a database and used for training machine-learning models to classify each data field and each search parameters in 12. The classification may e.g. output classes like low/medium/high in term of processing resource consumption (to be used for determining an amount of processing resources for determining data pieces in activity 66 of FIGS. 6A/6B) and never/sometimes/always in term of follow-up search request occurrence (to be used for determining an order of data fields considered in activity 66 of FIGS. 6A/6B).

Note that the aforementioned mechanisms to draw conclusions from previous follow-up search requests may not only be utilized for determining 31 essential and non-essential data fields, but may likewise be employed to determine if and which data fields are selected for computing non-essential data pieces in a time window between the initial search response 35 and the follow-up search request 36 (FIG. 7). For example, based on an evaluation 11 of previous follow-up search requests, the search engine 2 may decide to utilize processing resources to compute non-essential data pieces for such non-essential data fields which are likely subject of the follow-up search request 36, whereas other data pieces of non-essential data fields that are, according to statistics or assessments of a machine-learning models, likely not requested by the follow-up search request 36 may not be computed before receiving the follow-up search request 36.

Utilizing feedback from previous follow-up requests 36 may be combined with taking into account processing resources required for determining data pieces and the current state of the search engine, as explained above with reference to FIGS. 6A and 6B. Such combined embodiments may, for example, determine scores representing a combination of multiple factors (processing resources required, processing resources available, feedback from previous follow-up search requests), and the determination 31 of a data field being essential or non-essential is then based on the score.

The processes of determining 31 essential data fields, e.g. in the versions of FIGS. 6A and 6B, have been described as being executed at search request time, i.e. in response to the reception of a search request 30. It is noted that these processes may also be performed incrementally for one or more stages of follow-up search requests 36, namely for any data fields which have not been determined to be essential in earlier request-response stages. For example, computing 38 non-essential data pieces may again comprise a determination that a subset of the previously non-essential data fields is essential, while another subset of these data fields is still determined to be non-essential. Hence, computing activity 38 may include computing data pieces which are determined to be essential for responding to the follow-up search request 36. In other words, a similar mechanism described for processing an initial search request 30 may also be utilized at any incremental follow-up search request stage.

Moreover, determining essential data fields 31 may also be performed asynchronously to a search request reception. For example, the search engine 2 may have a predetermined set of possible search requests or may utilize mechanisms to anticipate search requests, and may thus perform processes like FIGS. 6A and/or 6B prior to reception of the search request 30. In such scenarios, consideration of the amount of processing resources required to determine data pieces (activity 66) and/or the comparison with the currently available processing resources (activity 67) may be performed as forecasts. Such anticipatory determination of essential data fields may shorten response times in the event of a search request received at a later point of time.

Some embodiments further comprise computing the at least one dynamic data piece for each initial search result indicated in the follow-up search request is performed by a further search engine 2a outsourced from the search engine 2. Such scenario is visualized in FIG. 8 according to which the client 7 directs the follow-up search request to the further search engine 2a. The further search engine 2a may be a functional part of the search system 1, even if the further search engine 2a may be geographically dislocated from the search engine 2. In some embodiments, the further search engine 2a is realized by a cloud service.

In some embodiments, as already described above, the follow-up search request 36 includes an identifier per at least one of the initial search results in the subset of the initial search results. In such embodiments, the method further comprises storing at least the returned subset of the initial search results in a memory, retrieving, using the identifier, the initial search results indicated in the follow-up request from the memory, computing the at least one dynamic data piece for each initial search result indicated in the follow-up search request based on the respective at least one essential data piece of the initial search results retrieved from the memory. Hence, the further search engine 2a may retrieve initial search results provided to the client 7 with the initial search response 35 from a memory in order to utilize any IDs indicated in the follow-up search request 36. This may relieve the search engine 2 further from processing load and may facilitate scalability of processing resources.

Figure 8:
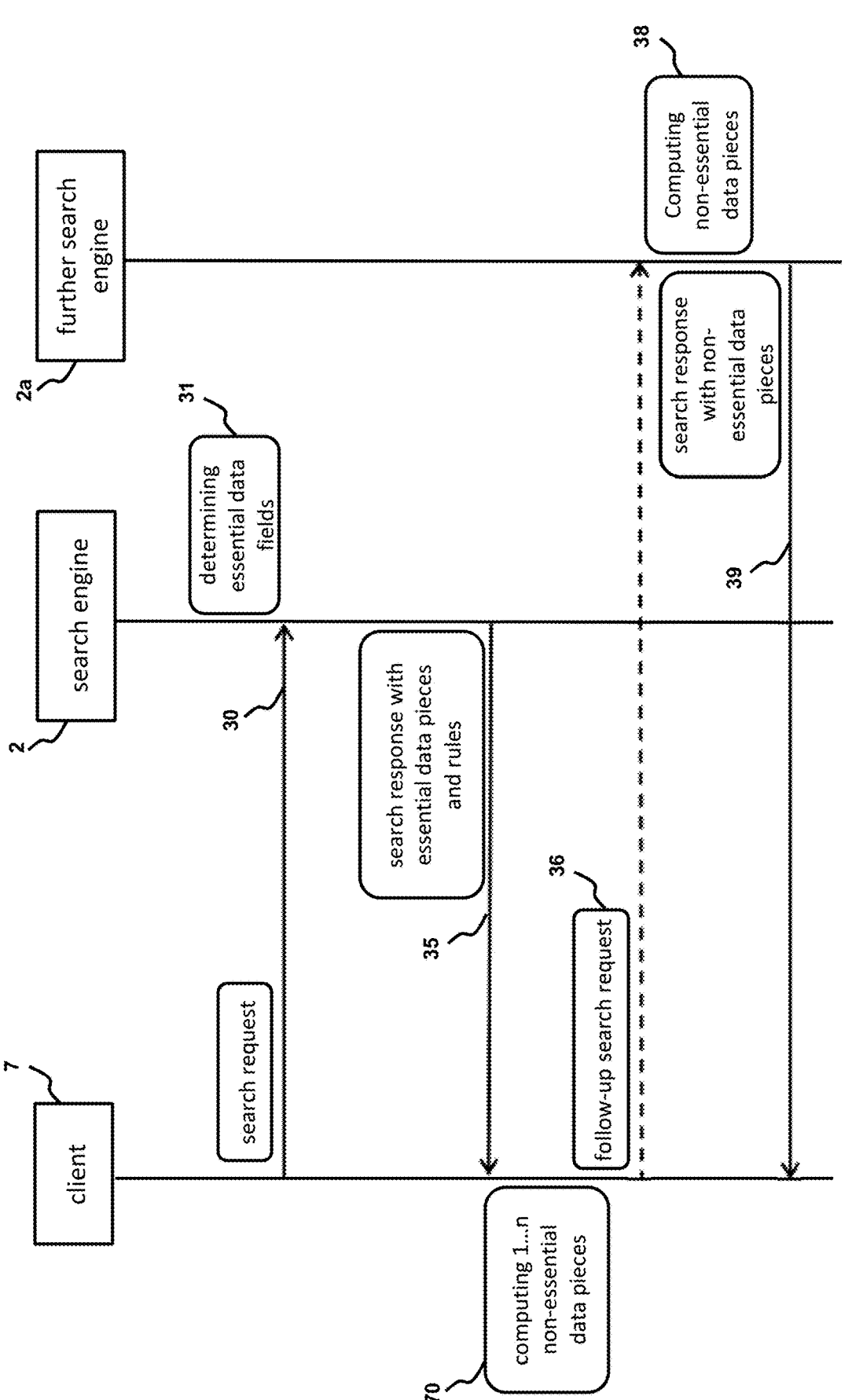
FIG. 8 depicts an offload scheme to compute non-essential data pieces by a further search engine.

As shown by FIG. 8, utilizing a secondary search engine 2a may be combined by outsourcing some of the computation of non-essential data pieces to the client 7, and optionally also with the refinements of FIGS. 6A and 6B. Moreover, mixed approaches in the sense that some of the non-essential data pieces are computed by the search engine 2 and other non-essential data pieces are computed by the further search engine 2a are encompassed as well. In such scenarios, the client 7 may send a logical part of the follow-up search request 36 to the search engine 2 (e.g. for Parameter 1) and another logical part of the follow-up search request 36 to the further search engine 2 (e.g. for Parameter 2).

In summary, the present methodologies enable a search engine 2 to utilize its technical processing resources for processing search requests on a more fine-grained basis, taking into account requirements of the client 7 as well as processing resources to be used for determining data pieces and processing resources available to the search engine. Overall, scalability and distribution of available processing resources over time are facilitated, without compromising quality of service for the search procedure. On the contrary, the present methodologies may even, at the same time, decrease response times by determining non-essential data pieces which may not be time-critical and the computation of which may be deferable to a later point of time.

Note that the present methodologies as described above, if applied by a search engine 2, do not necessarily have to applied for all search requests and follow-up search requests received by the search engine 2. For example, the search engine 2 may apply the methodologies for some types of search requests, but may not apply the methodologies for other types of search requests which are then handled in a traditional manner. Or the search engine 2 may apply the methodologies for search requests from some clients 7, but not for search requests from other clients. Or the search engine may apply the methodologies during some periods of time, but not during other periods of time, etc.

As mentioned above, the present methodologies may be provided by a computer-implemented method, by an apparatus such as a controller as well as by computer program instructions which, when executed by at least one processor, realizes the operations described above.

Figure 9:
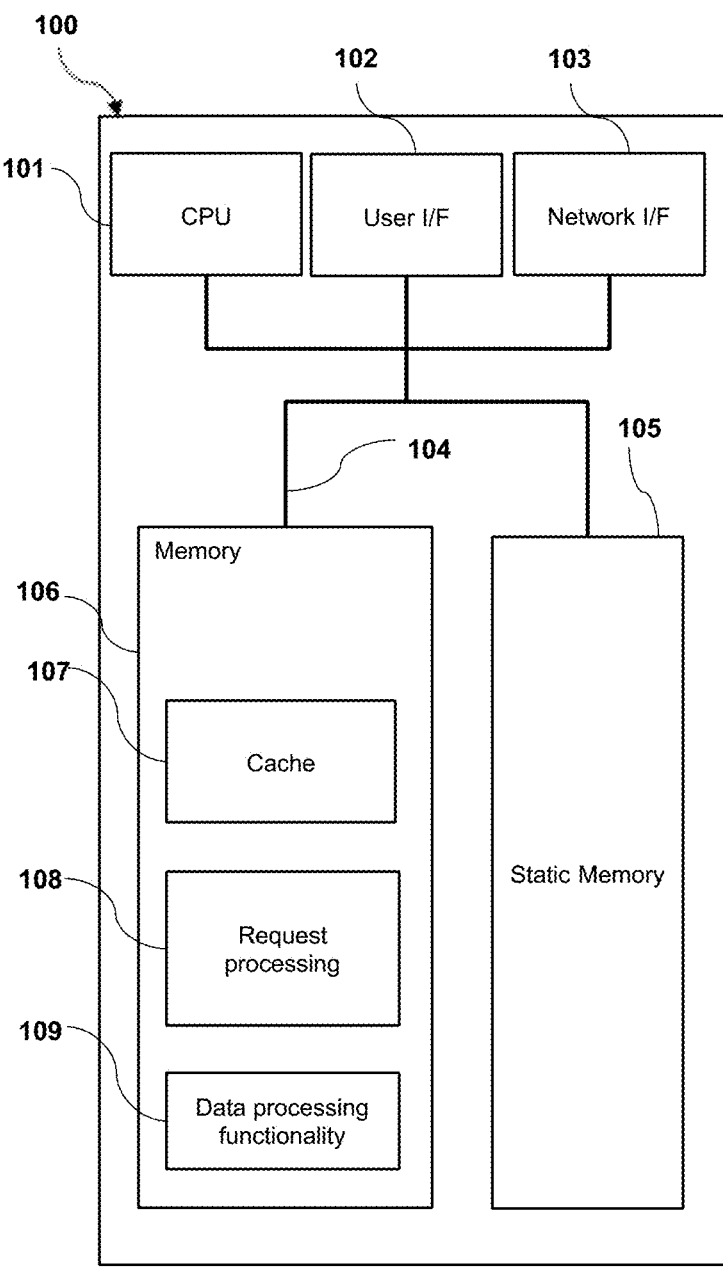
FIG. 9 shows a computerized system for implementing a search engine and/or client device as described herein.

FIG. 9 is a diagrammatic representation of the internal components of a computing machine 100 implementing the functionality of the search engine 2 as well as other entities described herein such as the clients 7. The computing machine 100 includes a set of instructions to cause the computing machine 100 to perform any of the methodologies discussed herein when executed. The computing machine includes at least one processor 101, a main memory 106 and a network interface device 103 which communicate with each other via a bus 104. Optionally, the computing machine 100 may further include a static memory 105 and a disk-drive unit. A video display, an alpha-numeric input device and a cursor control device may be provided as examples of user interface 102. The network interface device 103 connects the computing machine 100 to the other components of the search system 1 such as the clients 7 or the external data sources 9.

The main memory 106 may store temporary program data to facilitate the functionality of the computing machine 100 such as the search engine. 2 For example, the main memory 106 may store computer program data 107 to implement functionalities to receive and process search requests and computer program data 108 to implement functionalities to determine the essential data pieces, computing non-essential data pieces, forming search responses as well as the other functionalities of the search engine 2 as described above. If the computing machine 100 implements the search engine 2, the main memory 106 may also store a file or database 109 holding the computation rules 5. The same may also be held in the static memory 105.

A set of computer-executable instructions (computer program code 108) embodying any one, or all, of the methodologies described herein, resides completely, or at least partially, in or on a machine-readable storage medium, e.g., the main memory 106. For example, the instructions 108 may include software processes implementing the functionality to identify a number of search results corresponding to the search request.

The instructions 108 may further be transmitted or received as a propagated signal via the Internet through the network interface device 103 or via the user interface 102. Communication within computing machine 100 is performed via a bus 104. Basic operation of the computing machine 100 is controlled by an operating system which is also located in the main memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

The invention claimed is:

1. A method for processing search requests, the method comprising:

receiving, at a computing platform, a search request from a client, the search request indicating at least one search parameter;

determining, at the computing platform, a number of initial search results, wherein each of the initial search results comprise at least one respective essential data piece which corresponds to the at least one search parameter and omit at least one respective non-essential data piece associated with the at least one respective essential data piece;

returning, by the computing platform, at least a subset of the initial search results to the client, wherein each search result of the subset of the initial search results includes the at least one respective essential data piece and omits the at least one respective non-essential data piece;

receiving a follow-up search request from the client indicating at least one of the initial search results in the subset of the initial search results;

computing at least one non-essential data piece for each of the at least one initial search results, in the subset of the initial search results, indicated in the follow-up search request, based on a number of dynamic computation rules; and returning the computed at least one non-essential data piece for each of the at least one initial search results, in the subset of the initial search results, to the client, wherein one or more of:

computing the at least non-essential data piece requires an amount of computation resources above a given threshold; and the at least one non-essential data piece is omitted from the initial search results based on a current state of the computing platform.

2. The method of claim 1, wherein the current state of the computing platform comprises one or more of a number of search requests received within a given time interval, an amount of computation resources recently spent, a number or ratio of external data sources recently contacted, an amount of memory currently utilized, a current network load measure.

3. The method of claim 1, wherein the initial search results returned to the client include an indication that the at least one non-essential data piece omitted in the initial search results are available in response to the follow-up search request.

4. The method of claim 1, wherein computing the at least one non-essential data piece for each initial search result indicated in the follow-up search request based on a number of dynamic computation rules at least partly occurs in a time after returning the initial search results to the client and before receiving the follow-up search request.

5. The method of claim 1, further comprising:
providing, to the client, the number of dynamic computation rules to enable to client to compute the at least one dynamic data piece for each initial search result.

6. The method of claim 1, further comprising:
determining the at least one non-essential data piece to be omitted from the initial search results based on previous follow-up search requests.

7. The method of claim 1, wherein computing the at least one dynamic data piece for each initial search result indicated in the follow-up search request is performed by a further computing platform outsourced from the search engine.

8. The method of claim 1, wherein the follow-up search request includes an identifier per at least one of the initial search results in the subset of the initial search results, and the method further comprises:
storing at least the returned subset of the initial search results in a memory;
retrieving, using the identifier, the initial search results indicated in the follow-up request from the memory;
computing the at least one dynamic data piece for each initial search result indicated in the follow-up search request based on the respective at least one essential data piece of the initial search results retrieved from the memory.

9. The method of claim 1, wherein essential data pieces are designated as mandatory to return to the client in response to the search request, and non-essential data piece pieces are designated as optional to return to the client in response to the search request.

10. A computing system comprising a client device and a computing machine implementing a search engine, wherein the computing machine implementing the search engine is configured to perform the method according to claim 1.

11. A computer program product comprising a non-transitory computer-readable medium storing program code which, when executed by a computer, causes the computer to execute the method of claim 1.

12. A computer comprising:
at least one processor; and
a non-transitory computer-readable storage medium having stored thereon program instructions that, when executed by the at least one processor, causes the at least one processor to perform a set of operations comprising the method of claim 1.

* * * * *